(12) United States Patent
Kirby

(10) Patent No.: US 7,618,047 B2
(45) Date of Patent: Nov. 17, 2009

(54) AUTOMOBILE STEERING LINKAGE SYSTEMS AND METHODS

(75) Inventor: Daniel Kirby, Cary, NC (US)

(73) Assignee: Ford Global Technologies, LLC, Dearborn, MI (US)

( * ) Notice: Subject to any disclaimer, the term of this patent is extended or adjusted under 35 U.S.C. 154(b) by 430 days.

(21) Appl. No.: 11/292,540

(22) Filed: Dec. 2, 2005

(65) Prior Publication Data

US 2007/0126197 A1 Jun. 7, 2007

(51) Int. Cl.
*B60G 7/02* (2006.01)
*B62D 17/00* (2006.01)
*B62D 7/16* (2006.01)
*B62D 7/20* (2006.01)

(52) U.S. Cl. ............... 280/86.758; 280/76.75; 280/93.51; 280/93.511

(58) Field of Classification Search ............ 280/86.758, 280/93.51, 93.511, 86.75
See application file for complete search history.

(56) References Cited

U.S. PATENT DOCUMENTS

| | | | |
|---|---|---|---|
| 1,551,711 A * | 9/1925 | Toaz | 280/93.511 |
| 1,646,288 A * | 10/1927 | Graham | 403/136 |
| 1,854,938 A | 4/1932 | Jantsch | |
| 3,749,415 A | 7/1973 | Sampatacos | |
| 3,938,822 A | 2/1976 | Guerriero | |
| 4,162,859 A | 7/1979 | McAfee | |
| 4,327,926 A * | 5/1982 | Suganuma | 280/93.511 |
| 4,875,697 A * | 10/1989 | Miller | 280/86.758 |
| 5,529,316 A | 6/1996 | Mattila | |
| 6,047,789 A | 4/2000 | Iwanaga | |
| 6,719,312 B2 * | 4/2004 | Thompson et al. | 280/93.511 |
| 6,733,019 B2 * | 5/2004 | Diener et al. | 280/93.51 |
| 6,851,688 B2 * | 2/2005 | Barry | 280/93.51 |

* cited by examiner

*Primary Examiner*—Paul N. Dickson
*Assistant Examiner*—Joselynn Y. Sliteris
(74) *Attorney, Agent, or Firm*—O'Brien Jones, PLLC

(57) ABSTRACT

Automobile steering linkage systems and methods are provided in the various embodiments of the present invention. Some embodiments of the present invention can be used in heavy-duty automobiles for steering linkage toe-adjustment systems, and other embodiments can be utilized in other automobiles. An automobile steering linkage system can comprise a first rod and a unitary second rod. The first rod can be coupled between a first point and a first wheel, and the length of the first rod can be altered. The second rod can be coupled to the first wheel and a second wheel, and an eccentric ball stud can couple the second rod to the second wheel to alter the distance between the first wheel and the second wheel thus providing an automobile toe-adjustment system. Other embodiments are also claimed and described.

16 Claims, 3 Drawing Sheets

FIG. 1
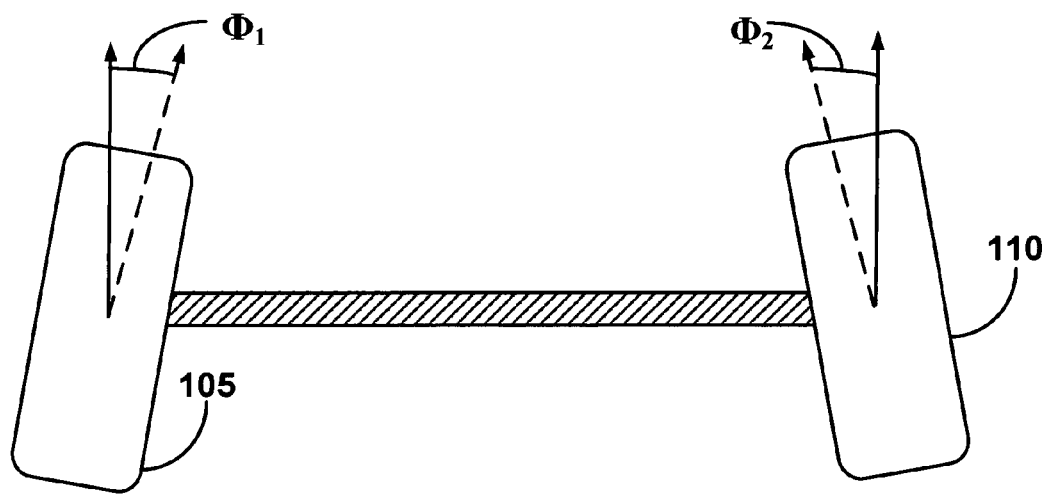
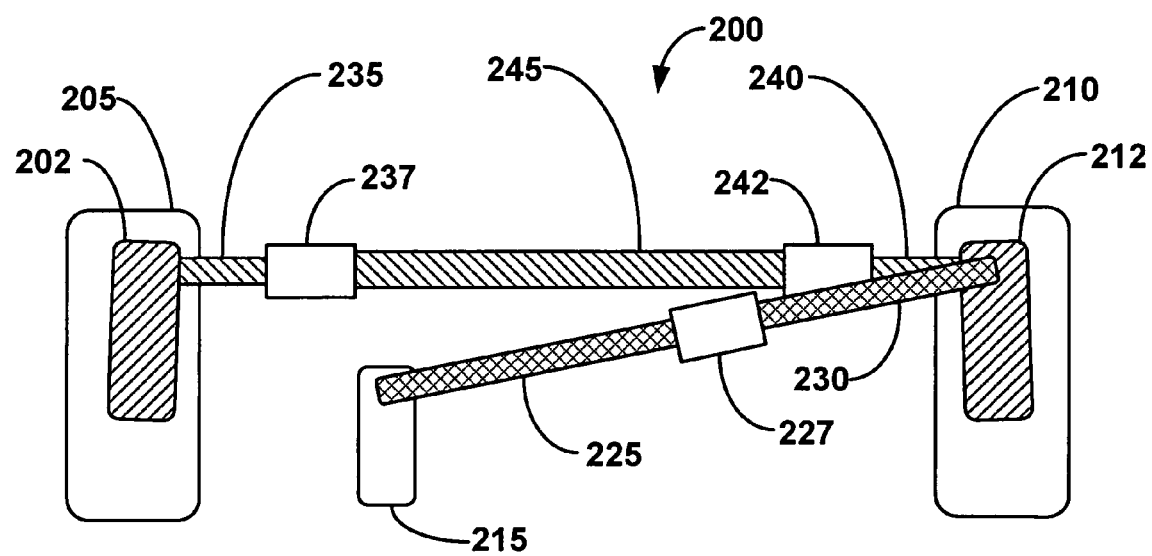
FIG. 2
(PRIOR ART)

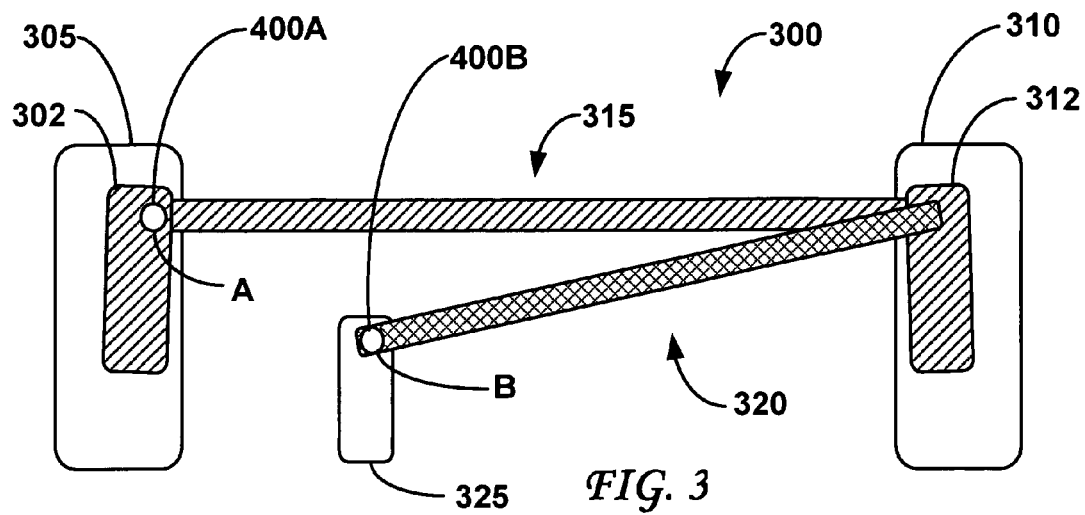
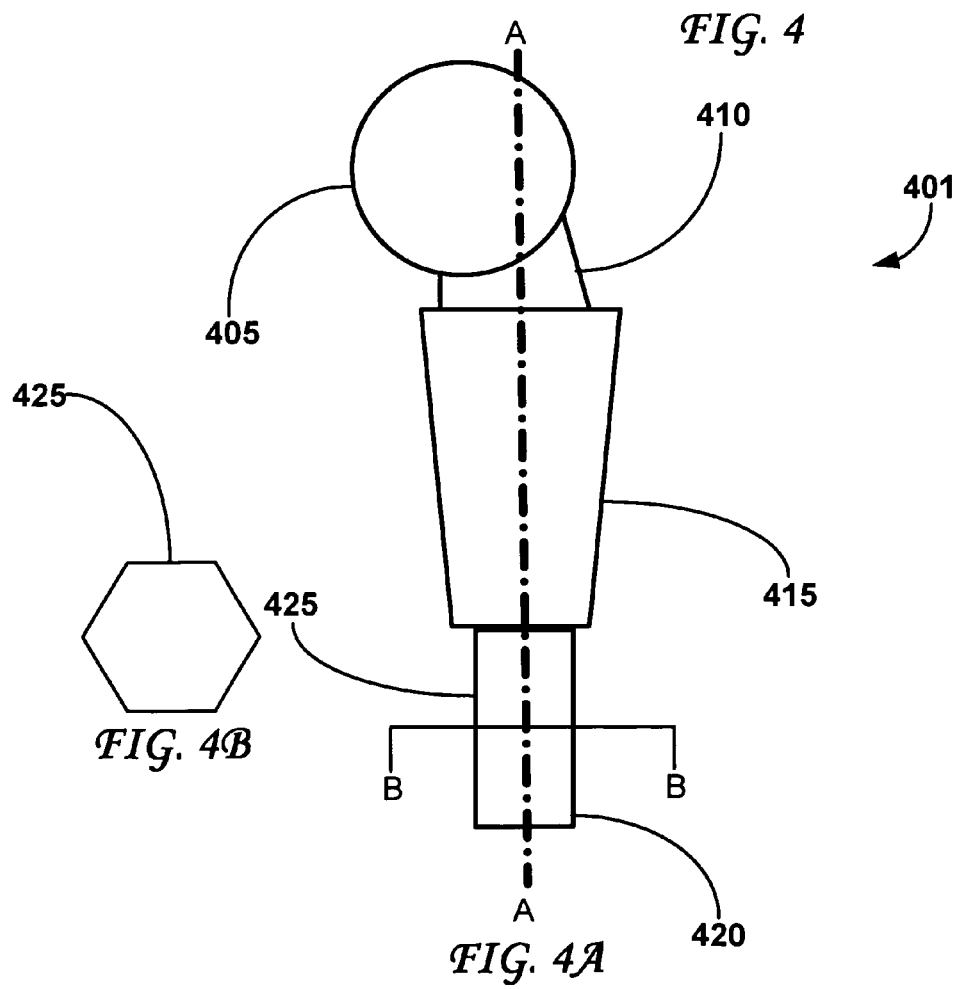

AUTOMOBILE STEERING LINKAGE SYSTEMS AND METHODS

TECHNICAL FIELD

The various embodiments of the present invention relate generally to automobile steering systems, and more particularly, to steering linkage toe-adjustment systems and methods used in automobiles and heavy-duty automobiles.

BACKGROUND

Toe-adjustment systems enable adjustment of the toe angles for the front wheels of an automobile. The toe angle for a front wheel is an angle between a straight wheel position and an imaginary line in the direction in which a vehicle moves. The imaginary line runs along the wheel and tire center as depicted in FIG. 1, and the toe angle is depicted as phi ($\Phi$). In FIG. 1, a vehicle has front wheels 105, 110, and each wheel has a toe angle ($\Phi_1$, $\Phi_2$). Toe angle affects both straight ahead stability and cornering transition feel of vehicles, thus automobile manufacturers strive to adjust the toe-angle to an optimal setting to provide a vehicle that has ideal stability and cornering attributes.

Current toe-adjustment systems used in automobile steering linkage systems range in component parts and functionality. While serving their respective purposes, current toe-adjustment systems have drawbacks and can be improved to meet the rapid changing demands of automobile manufactures. For example, some drawbacks relate to the many components used in current toe-adjustment systems making them unnecessarily complex. Indeed, due to the numerous component parts in a toe adjustment system, if one component part breaks down the integrity of the toe-adjustment system can be affected resulting in non-optimal toe angles. In addition, some of the numerous component parts are redundant thereby increasing overall component costs and associated automobile manufacturing costs.

BRIEF SUMMARY OF THE INVENTION

The various embodiments of the present invention solve the above mentioned and other problems by providing improved steering linkage toe-adjustment systems and methods. The various embodiments of the present invention provide reliable steering linkage toe-adjustment systems and methods that utilize fewer components relative to conventional toe-adjustment systems and methods. Using fewer component parts provides reliable, less redundant toe-adjustment systems and also reduces redundant components thereby reducing costs. The embodiments of the present invention can be utilized with many automobiles, and are especially useful with heavy-duty automobiles, such as large size pick-up trucks, utility vehicles, and other similar vehicles having large payload and carrying capacities. The embodiments of the present invention can be utilized by automobile manufacturers or as after-market products.

In accordance with some embodiments of the present invention, an automobile steering linkage system comprises a first rod and a unitary (one-piece) second rod having a fixed length. The system can also comprise a first point, a second point, and a third point. The first point can be a fixed point on an automobile chassis or a connection point to a steering arm, the second point can be associated with a first wheel, and the third point can be associated with a second wheel. The first rod can be coupled between the first point and the second point, and the unitary second rod can be coupled between the second and third point. The system can further comprise an adjustment mechanism including an eccentric ball stud. The adjustment mechanism can correspond with at least one of the first point and the third point, and rotation of the eccentric ball stud can alter a toe angle for at least one of the first wheel and the second wheel. Also according to some aspects of the invention, rotation of the eccentric ball stud can alter a toe angle for the first wheel and a toe angle for the second wheel. This alteration can occur substantially simultaneously in some embodiments.

In another embodiment of the present invention, a steering linkage toe-adjustment method comprises determining a toe angle for at least one of a first wheel and a second wheel, coupling the first wheel to the second wheel with a unitary rod having a fixed length, and coupling one of the first wheel and the second wheel to a fixed point with a second rod. The method can also comprise coupling an eccentric ball stud to at least one of the unitary rod and the second rod and rotating the eccentric ball stud until a toe angle for at least one of the first wheel and the second wheel approximately equals the predetermined toe angle for the first wheel or the second wheel.

In still yet another embodiment of the present invention, an automotive system comprises a first wheel, a second wheel, a first rod, and a second rod. At least one of the first rod and the second rod is a one-piece integral component. The first rod is connected between the first wheel and the second wheel, and more particularly connected between steering knuckles associated with each wheel. Also, the second rod is connected between the second wheel and a connection point, such as a steering arm to receive steering input. The system also comprises an eccentric ball stud in communication with at least one of the first rod or the second rod so that rotation of the eccentric ball stud alters a toe angle for one of the first wheel and the second wheel.

BRIEF DESCRIPTION OF THE FIGURES

FIG. 1 illustrates a plan view of toe angles for a right front vehicle wheel and a left front vehicle wheel.

FIG. 2 illustrates a plan view of a conventional steering linkage system.

FIG. 3 illustrates a plan view of a steering linkage toe-adjustment system according to some embodiments of the present invention.

FIGS. 4A and 4B (collectively FIG. 4) illustrate a perspective view of an eccentric ball stud with an improved design and physical structure utilized in accordance with some embodiments of the present invention.

DETAILED DESCRIPTION OF PREFERRED EMBODIMENTS

Figure 5:
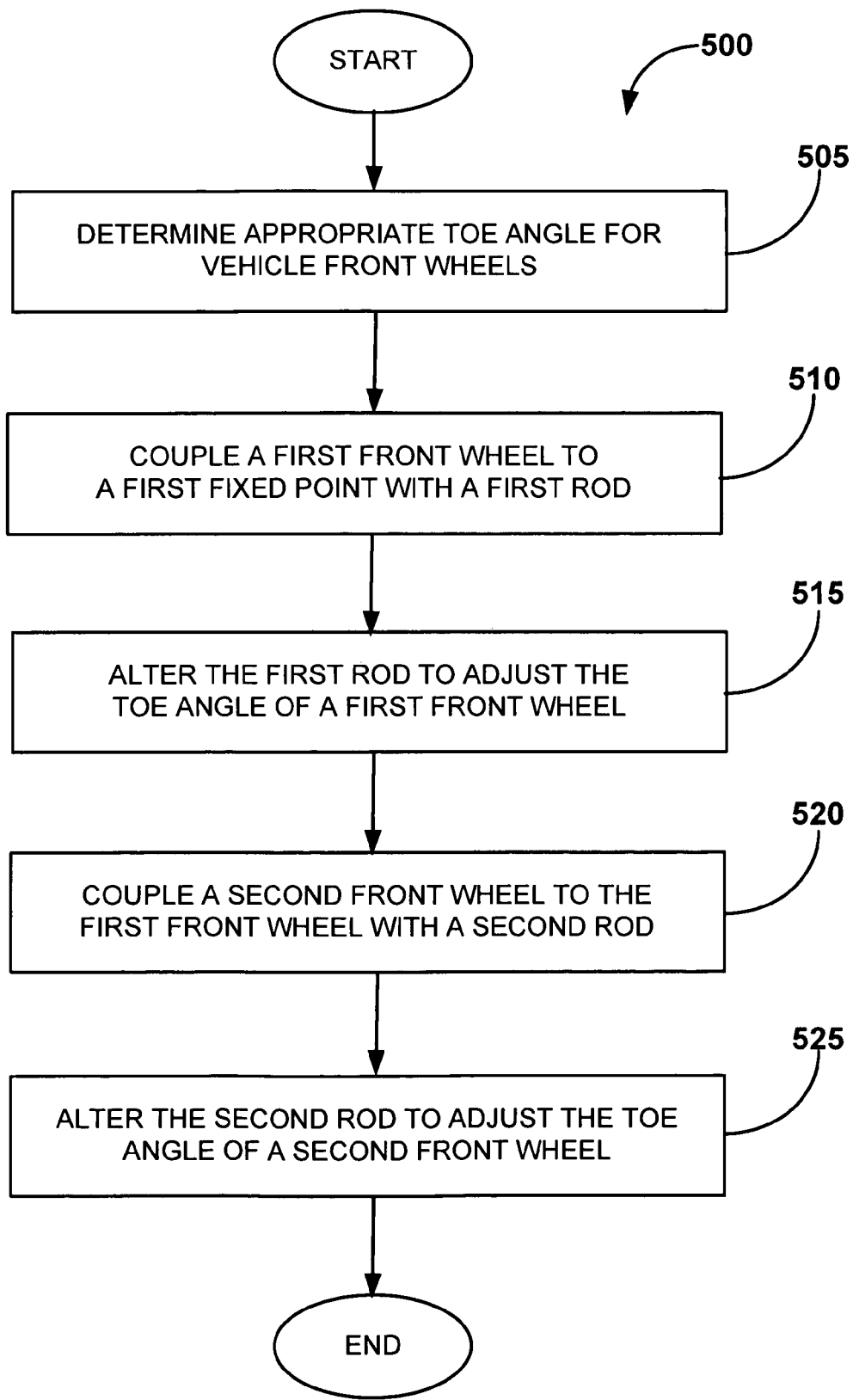
FIG. 5 illustrates a logical flow diagram of a steering linkage toe-adjustment method according to some embodiments of the present invention.

Referring now to the drawings, in which like numerals represent like elements, exemplary embodiments of the present invention are herein described.

FIG. 1 illustrates a toe angle for a left front wheel 105 and a right front 110 wheel for a vehicle. The toe angle for the left front wheel 105 is denoted as $\Phi_1$ and the toe angle for the right front wheel 110 is denoted as $\Phi_2$ in FIG. 1. In some embodiments of the present invention, the toe angles $\Phi_1$, $\Phi_2$ can be set to different angles while in other embodiments, the toe angles can be approximately equal to each other. For example, the toe angles can be set within a range of angles such as from approximately one degree to approximately three degrees. Those skilled in the art will understand, however, that many other toe angles are also possible. While FIG. 1 illustrates wheels 105, 110 having greatly varied toe angles at inverted angles, typical toe angles for automobiles are generally close together and generally have the same orientation so that the wheels 105, 110 point generally in the same direction.

Automobile manufacturers can determine the optimal toe angles for the front wheels of a vehicle to assist in controlling the stability and cornering properties of a vehicle. The toe angles for one vehicle type may differ from another vehicle, and the toe angles for the front wheels of a vehicle may depend on the type of vehicle and the purpose of the vehicle. For example, the toe angles for a FORD TAURUS® luxury sedan may differ from that of the FORD F-350® super-duty pickup truck because these vehicles are designed differently and are typically used in different operating environments. The toe angles for these vehicles, however, are determined and are usually set during manufacturing to provide optimal stability and cornering properties. Although automobile manufacturers set toe angles, the various embodiments of the present invention also enable automobile owners and mechanics to adjust and set toe angles for servicing needs.

FIG. 2 illustrates an existing current steering linkage system 200. As shown, the current system 200 includes numerous parts causing this current system 200 to have an increased overall component cost and manufacturing cost. The system 200 includes a left front wheel 205 and a right front wheel 210. The system 200 also includes a point 215, which is typically a steering arm. The point 215 is coupled to right front wheel 210 by an upper link 225 and a lower link 230. The upper link 225 is attached to the point 215 with a conventional symmetric ball joint/ball stud coupling mechanism, and the lower link 230 is coupled to the right front wheel 210 with a conventional symmetric ball joint/ball stud coupling mechanism at a steering knuckle 212 located at the right front wheel 210. The upper link 225 and the lower link 230 are coupled together with an adjustment sleeve 227. The adjustment sleeve 227 can be adjusted so that the combined lengths of the lower and upper links 225, 230 can be increased or decreased. As used herein, an adjustment sleeve can be similar to those discussed in U.S. Pat. No. 3,938,822, entitled ADJUSTABLE TIE ROD ASSEMBLY, which is hereby incorporated by reference in its entirety as if fully set forth herein.

Two outer tie rods 235, 240 and an inner tie rod 245 are also shown. These rods 235, 240, 245 span from the left front wheel 205 to the right front wheel 210 by being connected with steering knuckles 202, 212. As those skilled in the art will understand, movement of the knuckles 202, 212 also causes movement of the wheels 205, 210 to enable steering of an automobile. The rods 235, 240, 245 are coupled together with two adjustment sleeves 237, 242. The adjustment sleeves 237, 242 can be adjusted so that the overall combined length of the outer tie rods 235, 240 and inner tie rod 245 can be increased or decreased. The outer tie rods 235, 240 are coupled to the left and right front wheels 205, 210 with conventional symmetric ball joint/ball stud coupling mechanisms at the steering knuckles 202, 212.

Adjusting the toe angles of the left and right wheels 205, 210 in the system 200 is an extensive, time-consuming process. Toe angle adjustment for wheels 205, 210 is accomplished by utilizing the adjustment sleeves 227, 237, 242. The adjustment sleeves 227, 237, 242 have internally threaded sides (not shown) for receiving the rods. The rods 235, 240, 245 also have exterior threads and are inserted into and rotated in the adjustment sleeves 227, 237, 242 until the wheels 205, 210 are placed at the appropriate toe angle. Once the appropriate toe angles have been reached, clamps are applied to the adjustment sleeves 227, 237, 242 to lock in the appropriate toe angles for the wheels 205, 210. This toe angle adjustment process is often cumbersome due to the many component parts in system 200. Also, the redundant components of system 200 introduce unnecessary complexity and component costs into system 200.

FIG. 3 illustrates an improved steering linkage toe-adjustment system 300 according to some embodiments of the present invention. The improved system 300 generally includes a left steering knuckle 302, left wheel 305, right wheel 310, and right steering knuckle 312. A unitary tie rod 315 and a unitary drag link 320 are also components of the improved system 300. The unitary tie rod 315 and the drag link 320 can have a fixed length. Also, according to alternative embodiments of the present invention, the unitary drag link 320 can be a multi-piece component. The unitary tie rod 315 directly couples the left steering knuckle 302 to the right steering knuckle 312, and is a single piece component. Also included in the improved system 300 is a steering arm point 325 to receive steering input into system 300. The drag link 320 directly couples the right steering knuckle 312 to the steering arm point 325. As can be seen by comparing FIG. 2 and FIG. 3, the improved system 300 contains less component parts than system 200.

The improved system 300 also includes at least one eccentric ball joint as illustrated in FIG. 4. In system 300, two eccentric ball joints 400A, 400B are illustrated. In some embodiments of the present invention, both eccentric ball joints 400A, 400B can be utilized while in other embodiments, only one eccentric ball joint may be utilized. For example, some embodiments may only include the eccentric ball joint 400A, and some embodiments may only include the eccentric ball joint 400B. These different exemplary configurations of the various embodiments of the present invention are discussed in greater detail below.

The eccentric ball joint can include an eccentric ball stud 401 (discussed in greater detail below with reference to FIG. 4) and an eccentric ball socket (not shown). The eccentric ball socket can be located within the steering knuckles 302, 312 or the steering arm point 325. The eccentric ball socket is adapted to receive the eccentric ball stud 401 so that the eccentric ball stud 401 can rotate in or move relative to the eccentric ball socket. The eccentric ball stud 401 can have a head portion 405 having a spherical shape, and the eccentric ball socket can be a spherically-shaped aperture to receive the spherical-shaped head portion 405. It will be understood that the head portion 405 and the eccentric ball socket can have other geometrical configurations in accordance with the various embodiments of the present invention.

As mentioned above, the various embodiments of the present invention can include several different exemplary configurations of the component parts discussed in FIG. 3. The first exemplary configuration is illustrated in FIG. 3 with eccentric ball joints at locations A and B. The toe angle of right wheel 310 at the right knuckle 312 is set using the eccentric ball joint 400B. Then the toe angle of the left wheel 305 is set using the eccentric ball joint 400A based off of the setting and placement of the eccentric ball joint 400B. This feature enables serial adjustment of system 300 in that a first toe angle is set and the other toe angle is based on or relative to the first toe angle after the first toe angle has been set.

The second and third exemplary configurations have similar configurations as the first exemplary configuration. The second exemplary configuration uses an eccentric ball joint at location B only. The unitary tie rod 315 length is fixed and not adjustable. The tie rod 315 is directly coupled between the steering knuckles 302, 312. This enables movement of one knuckle to move the other knuckle since the knuckles 302, 312 are coupled together by the tie rod 315. The eccentric ball joint 400B at location B can adjust the toe angles of the left wheel 305 and the right wheel 310 by rotating an eccentric ball stud 401 at location B. Rotation of the eccentric ball stud 401 at location B adjusts the toe angles for the wheels 305, 310 because the associated steering knuckles 302, 312 are directly coupled together with the tie rod 315. Thus rotation of a single eccentric ball stud can substantially simultaneously alter the toe angles of both wheels in accordance with the second exemplary configuration. Also, the second exemplary configuration can be utilized to make the toe angles of the left and right wheels 305, 310 have approximately the same toe angle magnitude from the imaginary line parallel to the direction of automobile motion.

In the third exemplary configuration, an eccentric ball joint is located at only location A. Also, the rod 320 is a multi-piece rod having components coupled together with an adjustment sleeve. The toe angle settings in this third exemplary configuration are similar to the first exemplary configuration in that the toe angle for the right wheel 310 is set using the multi-piece rod, and then the toe angle for the left wheel 305 is set using the eccentric ball joint 400A. In other words, the toe angle for the right wheel 310 is set and then the toe angle for the left wheel 305 is set so that the toe angles are set in a serial fashion.

FIGS. 4A and 4B, collectively FIG. 4, illustrate an eccentric ball stud 401 with an improved design utilized in accordance with some embodiments of the present invention. Many other eccentric ball stud designs can also be used in accordance with the embodiments of the present invention. Generally, the eccentric ball stud 401 comprises a head portion 405, a neck portion 410, a body portion 415, and a stem portion 420. As discussed above, the head portion 405 can have various geometric shapes, and for brevity of discussion will be referred to as having a generally spherical shape. The neck portion 410 couples the head portion 405 to the body portion 415 and also shifts the head portion 405 so that it is asymmetric about axis A-A, as shown in FIG. 4A. The body portion 415 is coupled to the stem portion 420, and the body portion 415 can be tapered such that the width of the body portion 415 decreases toward the stem portion 420.

The stem portion 420 extends from the body portion 415 and is preferably adapted so that the eccentric ball stud 401 can be secured or otherwise placed in a stationary position. In some embodiments, the stem portion 420 can be threaded so that a nut or other securing mechanism can engage the stem portion 420 and secure the eccentric ball stud 401 so that does not rotate about the axis A-A. It is also preferable that the stem portion 420 have an outer surface 425 that is engageable by a tool to rotate the stem portion 420 about the axis A-A.

Such an outer surface 425 is illustrated in FIG. 4B. The outer surface 425 has a hexagonal shape and can be engaged by various wrenches so that rotational energy can be imparted to the eccentric ball stud 401. In some embodiments the outer surface 425 can have one or more apertures for receiving a tool and rotational energy from the tool. Such a tool can be an Allen wrench, or other similar tool.

Rotating the stem portion 420 of the eccentric ball stud 401 enables the eccentric ball stud 401 to impart lateral force on a proximate component. Rotation of the stem portion 420 changes the lateral position of the head portion 405 because the head portion 405 is shifted to being asymmetric about axis A-A by the neck portion 410. When the head portion 405 is in contact within a joint or aperture, rotation of the stem portion 420 causes the head portion 405 to move thereby imparting a lateral force on the joint or aperture.

In accordance with the embodiments of the present invention, the steering knuckles 302, 312 and the steering arm point 325 can house an eccentric ball joint. When the eccentric ball joint is shifted due to rotation of the eccentric ball stud 401 within the eccentric ball joints, the steering knuckles 302, 312 and the steering arm point 325 move or shift due to the force transferred from the eccentric ball stud 401.

Thus, moving the steering knuckles 302, 312 and the steering arm point 325 changes the toe angle of the wheels 305, 310 since the steering knuckles 302, 312 are coupled to an effect movement of the wheel 305, 310. When an appropriate toe angle has been reached, the eccentric ball stud 401 can be secured within the steering knuckles 302, 312 or the steering arm point 325 so that the eccentric ball stud 401 cannot rotate. Securing the eccentric ball stud 401 thus enables an automobile manufacture, owner, or mechanic to set the toe angle for wheels 305, 310 to optimal angles.

FIG. 5 illustrates a logical flow diagram of a steering linkage toe-adjustment method 500 according to some embodiments of the present invention. The method 500 is only one method according to the various embodiments of the present invention. Accordingly, those skilled in the art will understand that other methods are contemplated by the various embodiments of the present invention, and that method 500 can be performed in various orders.

The method 500 starts at 505 where an appropriate toe angle for a vehicle wheel is determined. The appropriate toe angle can be determined based on automobile type, size, and weight as well as the desired drivability characteristics of an automobile. Those skilled in the art will understand that determining an optimal toe angle can be accomplished by analyzing an automobile's steering and handling characteristics based on numerous factors. Sample toe angles can range from approximately one degree to approximately three degrees. The embodiments of the present invention can be used to precisely set specific toe angles. In some embodiments, the toe angles for the front wheels of an automobile will be approximately the same and in other embodiments the toe angles for the front wheels may be different.

The method 500 continues at 510 where a first point is coupled to a first vehicle wheel with a first rod. The first point can be a point along the chassis of an automobile or a steering arm connection point. The first rod can be a unitary component having a fixed length or it can comprise multiple pieces. If the first rod comprises multiple pieces, the pieces can be coupled together with an attachment sleeve or any other mechanisms capable of adjusting the overall length of the first rod. Next at 515, the first rod is altered to adjust the toe angle of a first front wheel. In some embodiments, the first front wheel can be a right front wheel. Alteration of the first rod could include adjust its length or moving the rod to a set position by rotating an eccentric ball stud.

At 520, the method 500 continues by coupling a second front wheel to the first front wheel with a second rod. The front wheels can be also coupled to steering knuckles also coupled to the second rod. One or more of the steering knuckles could be moved or adjusted about a fixed point to move the second rod, and movement or adjustment of the second rod could be affected by an eccentric ball stud. Next the method 500 culminates at 525 where a second rod is altered to adjust the toe angle of a second front wheel. The second rod can be altered by adjusting its length or moving the rod to a set position by rotating an eccentric ball stud within an eccentric ball socket and securing the eccentric ball stud in a fixed position. As mentioned above, the present invention has numerous method embodiments and method 500 is only one such method embodiment.

The embodiments of the present invention can be used with compact automobiles, sedan-type automobiles, and small to mid-size truck and utility vehicles. In addition, the various embodiments of the present invention can be an after market feature to enhance the drivability of a vehicle previously manufactured. Still yet, the after market embodiments of the present invention enable automobile owners and mechanics to use the embodiments of the present invention on any make or model automobile.

While the various embodiments of this invention have been described in detail with particular reference to exemplary embodiments, those skilled in the art will understand that variations and modifications can be effected within the scope of the invention as defined in the appended claims. Accordingly, the scope of the various embodiments of the present invention should not be limited to the above discussed embodiments, and should only be defined by the following claims and all equivalents.

I claim:

1. A steering linkage toe adjustment system for a vehicle having first and second wheels and respective first and second steering knuckles and a steering arm point that receives a steering input into the system, the system comprising:
    a unitary tie rod coupled at a first end to the first steering knuckle, the unitary tie rod being coupled at a second end to the second steering knuckle via a first eccentric ball joint; and
    a unitary drag link coupled at a first end to the steering arm point via a second eccentric ball joint, the unitary drag link being coupled at a second end to the first steering knuckle.

2. The system of claim 1, wherein the unitary tie rod is a one-piece tie rod.

3. The system of claim 1, wherein the unitary drag link is a one-piece drag link.

4. The system of claim 1, wherein the unitary tie rod has a fixed length.

5. The system of claim 1, wherein the unitary drag link has a fixed length.

6. The system of claim 1, wherein the first and second eccentric ball joints each comprise an eccentric ball stud and an eccentric ball socket.

7. The system of claim 6, wherein one of the eccentric ball sockets is located in the steering knuckle.

8. The system of claim 6, wherein one of the eccentric ball sockets is located in the steering arm point.

9. The system of claim 6, wherein each of the eccentric ball studs comprises a stem portion engageable by a tool to rotate the eccentric ball stud.

10. The system of claim 9, wherein rotation of each of the eccentric ball studs alters a toe angle of a respective wheel of the vehicle.

11. The system of claim 10, wherein the toe angle of the first vehicle wheel equals the toe angle of the second vehicle wheel.

12. A method for serial adjustment of a steering linkage toe adjustment system of a vehicle having first and second wheels and respective first and second steering knuckles and a steering arm point that receives a steering input into the system, the first and second steering knuckles being coupled by a unitary tie rod, the method comprising:
    setting a toe angle of the first wheel by selling and placement of a first eccentric ball joint having a socket located in the steering arm point of the vehicle;
    setting a toe angle of the second wheel by setting and placement of a second eccentric ball joint having a socket located in the second steering knuckle;
    wherein the toe angle of the first wheel is set and then the toe angle of the second wheel is set based on the toe angle of the first wheel, and
    wherein the toe angle of the second wheel is set after the toe angle of the first wheel is set.

13. The method of claim 12, wherein selling and placement of the first eccentric ball joint comprises rotating a ball stud of the first eccentric ball joint.

14. The method of claim 13, wherein setting and placement of the second eccentric ball joint comprises rotating a ball stud of the second eccentric ball joint.

15. The method of claim 14, further comprising securing the eccentric ball studs after the toe angles have been set.

16. The method of claim 12, further comprising setting the toe angle of the second wheel to approximately equal the toe angle of the first wheel.

* * * * *